No. 670,343. Patented Mar. 19, 1901.
J. W. GOODALE.
AUTOMATIC VENTILATOR REGULATOR FOR INCUBATORS.
(Application filed June 7, 1900.)
(No Model.)
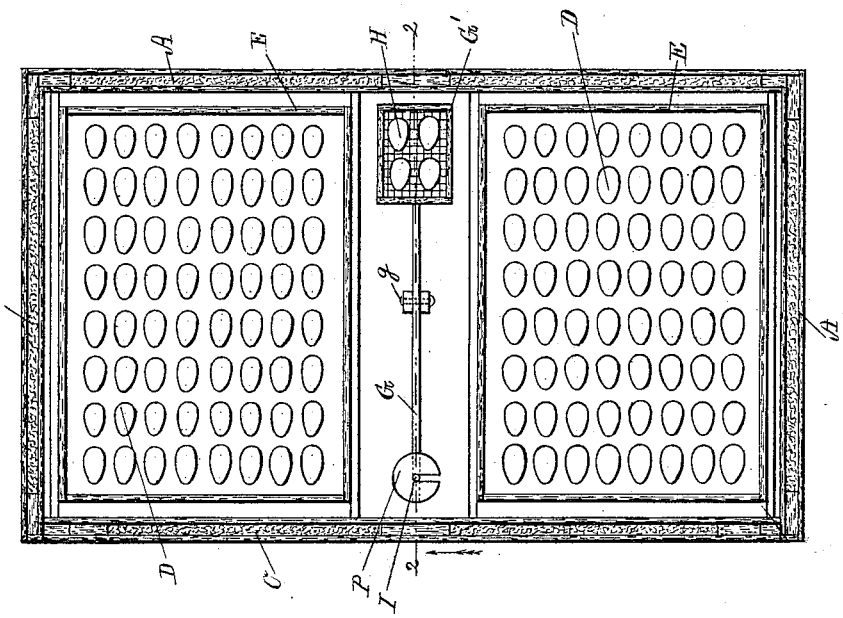
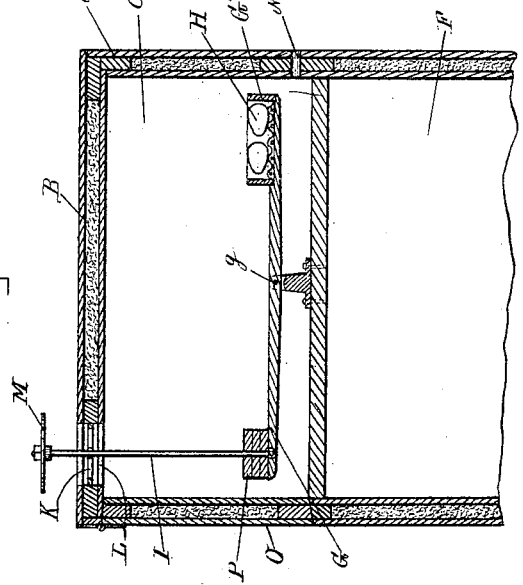

UNITED STATES PATENT OFFICE.

JAMES WALTER GOODALE, OF DANVERS, MASSACHUSETTS.

AUTOMATIC VENTILATOR-REGULATOR FOR INCUBATORS.

SPECIFICATION forming part of Letters Patent No. 670,343, dated March 19, 1901.

Application filed June 7, 1900. Serial No. 19,380. (No model.)

*To all whom it may concern:*

Be it known that I, JAMES WALTER GOODALE, a citizen of the United States, residing at Danvers, in the county of Essex and State of Massachusetts, have invented new and useful Improvements in Automatic Devices for Regulating the Ventilation of Incubators, of which the following is a specification.

This invention relates to improvements in automatic devices for controlling the evaporation of the eggs in incubators during the process of incubation, and it is carried out as follows, reference being had to the accompanying drawings, wherein—

Figure 1 represents a top plan view of an incubator provided with my automatic regulating device, showing the top portion of said incubator removed; and Fig. 2 represents a cross-section on the line 2 2 shown in Fig. 1.

Similar letters refer to similar parts wherever they occur on the different parts of the drawings.

During the process of hatching eggs in incubators it is very desirable to control the amount of ventilation in the egg-chamber, so as to automatically control the evaporation of the eggs during the progress of the hatching operation in order that the evaporation of the eggs may proceed from day to day in a manner like the natural brooding when the eggs are placed under a hen. For this purpose I employ in combination with an incubator an automatic regulating device as follows:

In the drawings is represented an incubator of any well-known size or construction, having inclosing walls A A and cover B, as usual.

C is the egg-chamber, in which the eggs D D are supported on removable trays or racks E E, as usual.

F represents the heating-chamber in the ordinary manner.

Within the egg-chamber C, I pivot at *g* a lever G, provided at one end with a case or receptacle G', adapted to contain a series of eggs H H, or, if so desired, said receptacle may be adapted to contain water or other suitable liquid. To the other end of said lever G is attached a rod I, which passes through a guide K in a perforation L in the cover or top of the incubator, as shown in Fig. 2. To the upper end of the rod or spindle I is attached a suitable valve or plate M, as shown.

N represents an air-inlet to the egg-chamber, if so required; but usually sufficient air is admitted to the egg-chamber through the crevices at the door-opening around the door O, and such air-inlet is therefore not absolutely necessary.

P P represent removable counter or balance weights adapted to be placed on the lever G, where it is connected to the valve-spindle I, as shown in the drawings.

The operation is as follows: At the time the eggs D are placed on the trays or racks E E, I place, preferably, two or more eggs H in the box or receptacle G', which is attached to the pivoted lever G, and I balance such lever by attaching to its opposite end one or more of the counterweights P P, according to the weight of the eggs contained in the receptacle G'. During the hatching operation the eggs gradually lose in weight by evaporation of their liquid contents, and in order that the evaporation of the eggs may proceed in a proper manner from day to day, as stated, it is necessary to automatically control the ventilation in the egg-chamber, and this is accomplished by the downward movement of the valve M toward or against the exit-opening L in the cover B, caused by the reduction in weight of the eggs H H or evaporation of the liquid contents of the box or receptacle G' and corresponding tipping of the lever G.

During the progress of the process of incubation the position of the lever G and valve M may be regulated by the removal at intervals of one or more of the weights P.

The invention is very simple in construction and can be applied to most any of the ordinary incubators now in use.

In practice I prefer to load the lever receptacle or box G' with eggs, as shown; but if so desired said box may contain water or other suitable liquid that gradually will lose a portion of its weight by evaporation.

This invention although especially designed for the purpose of regulating the ventilation of incubators may to equal advantage be used for the purpose of controlling the amount of moisture admitted to the egg-chamber.

What I wish to secure by Letters Patent and claim is—

1. In an incubator, the combination with the egg-chamber thereof provided with an air-delivery port, of a lever pivoted therein, a receptacle carried by one end of said lever, counterweights carried by the opposite end of said lever, a rod connected to the weighted end of said lever and extending upwardly through said air-delivery port, and a valve carried by the outer end of said rod.

2. In an incubator, the combination with the egg-chamber thereof provided with a suitable air-delivery port, of a guide K secured within the said port, a lever suitably mounted within said egg-chamber, a receptacle carried thereby, a series of removable weights carried by the said lever, a rod connected to said lever and extending upwardly through said guide K, and a valve mounted upon the outer end of the said rod, substantially as set forth and for the purpose herein specified.

3. In an incubator, the combination with the egg-chamber provided with an air-delivery port, of a guide K secured within said port, a horizontally-extending lever mounted in said egg-chamber, a receptacle carried by one end of said lever, a series of adjustable weights carried by the opposite end of said lever, a rod connected at its lower end to the weighted end of said lever, surrounded by said weights and extending upwardly through said port, and a valve secured to the upper end of said rod.

4. In an incubator, the combination with an egg-chamber having a port, of a lever fulcrumed in the chamber having a receptacle at one side of its fulcrum for carrying eggs or an evaporative substance, counterbalance means acting against the lever at the opposite side of said fulcrum, and a valve for controlling said port operated by the lever.

In testimony whereof I have hereunto set my hand in presence of two subscribing witnesses.

JAMES WALTER GOODALE.

Witnesses:
ALBAN ANDRÉN,
MARY A. WILLIAMS.